United States Patent
Nagamine et al.

(10) Patent No.: US 6,940,254 B2
(45) Date of Patent: Sep. 6, 2005

(54) TRADE-IN BATTERY SYSTEM

(75) Inventors: Masayuki Nagamine, Fukushima (JP); Masayoshi Kanno, Tokyo (JP); Shunichi Fujishima, Kansas City, MO (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/700,024

(22) Filed: Nov. 3, 2003

(65) Prior Publication Data

US 2005/0001591 A1 Jan. 6, 2005

(30) Foreign Application Priority Data

Nov. 5, 2002 (JP) ..................................... P2002-321722

(51) Int. Cl.$^7$ ............................................... H02J 7/00
(52) U.S. Cl. ........................................................ 320/109
(58) Field of Search ............................... 320/109, 110, 320/106; 455/406

(56) References Cited

U.S. PATENT DOCUMENTS

| | | | |
|---|---|---|---|
| 5,673,306 A | * | 9/1997 | Amadon et al. ............. 455/406 |
| 5,694,019 A | * | 12/1997 | Uchida et al. ............... 320/106 |
| 5,744,933 A | * | 4/1998 | Inoue et al. ................. 320/110 |
| 6,154,006 A | * | 11/2000 | Hatanaka et al. ........... 320/109 |

FOREIGN PATENT DOCUMENTS

| WO | WO-8503799 | * | 2/1985 |
|---|---|---|---|
| WO | WO-9112094 | * | 2/1991 |

* cited by examiner

*Primary Examiner*—Pia Tibbits
(74) *Attorney, Agent, or Firm*—Sonnenschein, Nath & Rosenthal LLP

(57) ABSTRACT

A trade-in battery system for purchasing used secondary batteries and selling the charged used secondary batteries, wherein the trade-in battery system comprises a purchasing step, a pre-storage deterioration inspection step, a charging step, a storage step, a packaging step, and a selling step.

14 Claims, 6 Drawing Sheets

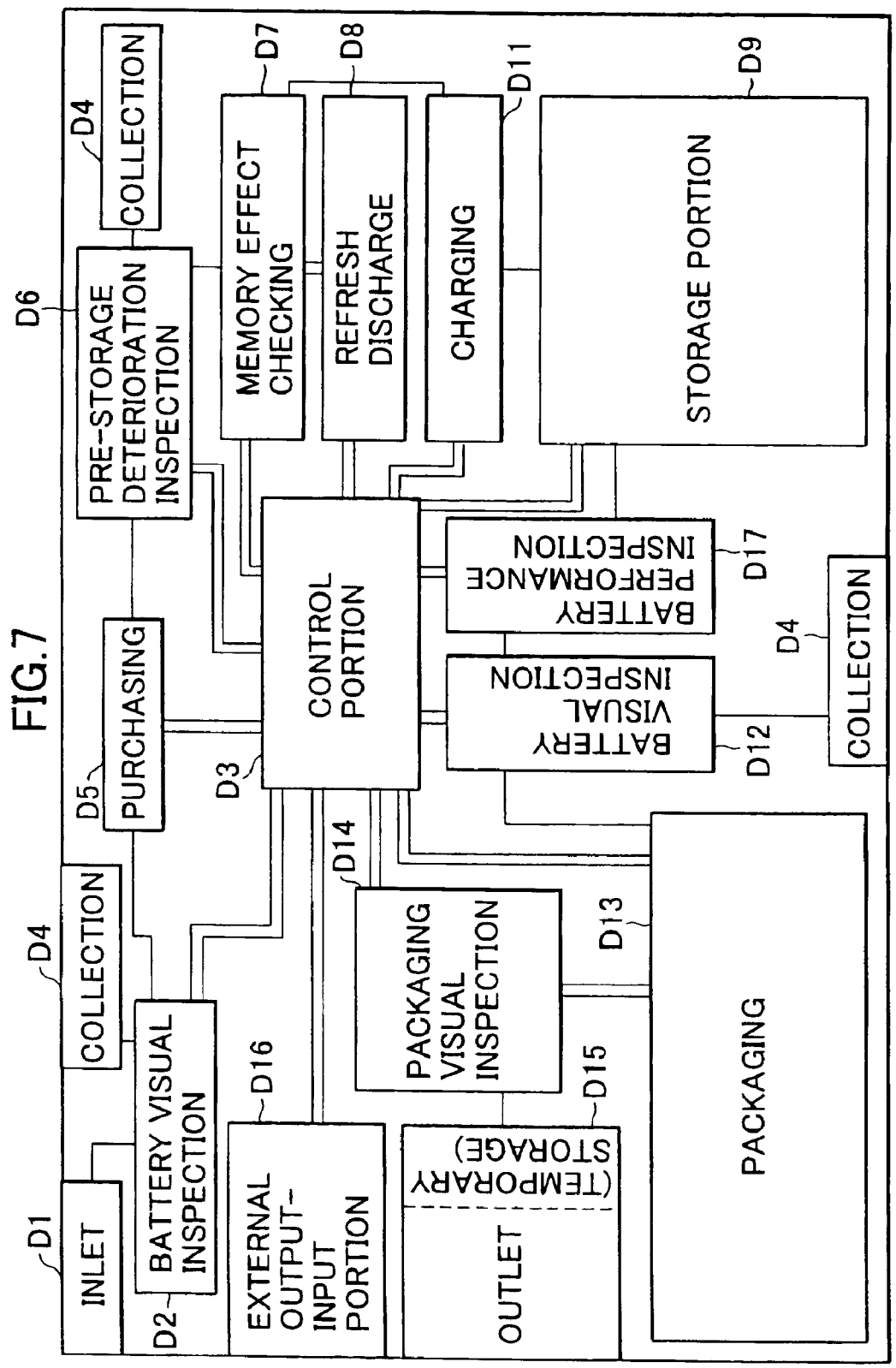

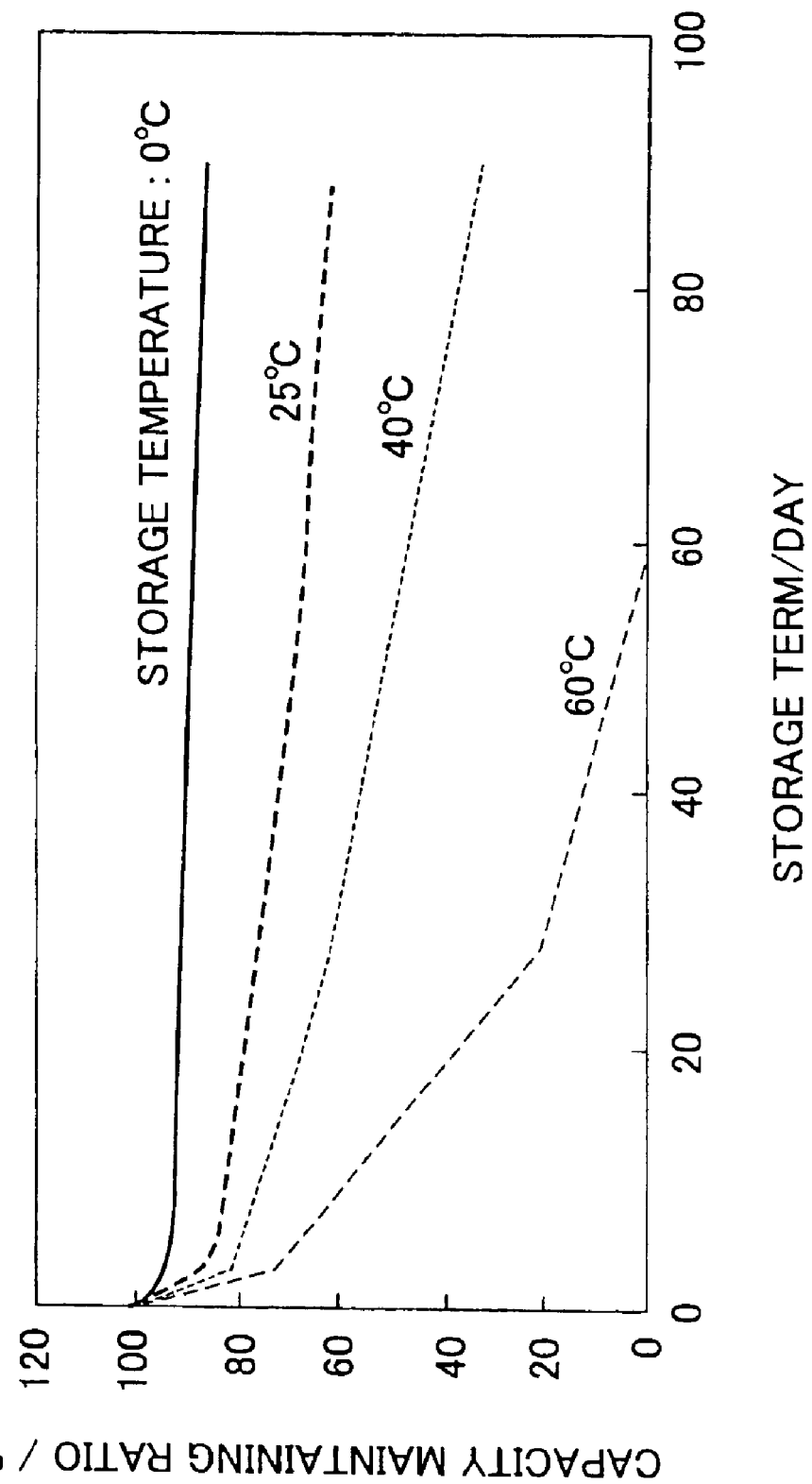

TRADE-IN BATTERY SYSTEM

CROSS REFERENCE TO RELATED APPLICATION

This application claims priority from Japanese Priority Document No. 2002-321722, filed on Nov. 5, 2002 with the Japanese Patent Office, which document is hereby incorporated by reference.

BACKGROUND OF THE INVENTION

1. Field of the Invention

The present invention relates to a trade-in battery system wherein used secondary batteries are purchased and then proposed for selling after being charged.

2. Description of Related Art

Recently, electric appliances are being dramatically developed, for example, they consume only small electric power and decrease in size and weight, and electric apparatuses which have conventionally been stationary type are changed to ones which are portable and sometimes used outdoors. As a power source for these portable electric apparatuses, batteries are generally used. For example, in apparatuses which use large electric power, such as a laptop personal computer, a portable phone, and a built-in camera type VTR, a secondary battery having a small size and a high charging capacity, such as a nickel-cadmium battery, a nickel-metal hydride battery, and a lithium ion battery, are used.

When a portable electric apparatus is carried on a business trip or a travel, taking into consideration the capacity of the secondary battery or the operating time of the electric apparatus, a battery charger has to be often also carried. In this case, there are disadvantages in that it makes the baggage heavy, that a lot of time is required for charging the battery when the secondary battery is lacking in charged capacity, that an additional operation for charging is needed, and that the secondary battery lacking in the charged capacity is inevitably used when charging is forgotten.

As compared to the secondary battery lacking in convenience, generally, a primary battery is easily available from the viewpoint of price and market and frequently used by users. In apparatuses in which a primary battery and a secondary battery are compatible, many users use primary batteries since they are free from burdensome operations, e.g., charging operation of a secondary battery. Further, some users purchase secondary batteries as if they are primary batteries, and many of the secondary batteries are disposed of after the secondary batteries are used without exhibiting their reusability.

However, as described that the times have changed from the 20th century of consumption to the 21st century of the environment, there are increasing users who have intention to effectively use resources and reduce a load on the environment as small as possible. In order to achieve this, it is considered that battery makers must take measures to promote the use of secondary batteries having both convenience similar to that in primary batteries and reusability with a small load on the environment. As an example of a method for promoting the use of the secondary batteries, there can be mentioned an improvement in the way of selling, and a service for secondary batteries provided with a market similar to that in primary batteries (Patent document 1), and an apparatus for selling and a way of selling for promoting the use of secondary batteries having reusability with a small load on the environment (Patent document 2) have already been studied, but there are a lot of tasks from a practical point of view, e.g., to achieve convenience similar to that in primary batteries, to distinguish the used secondary batteries from the charged secondary batteries, and to facilitate quality inspection and control of the used secondary batteries or the charged secondary batteries.

[Patent document 1] Unexamined Japanese Patent Application Laid-Open Specification No. 2001-283931

[Patent document 2] Unexamined Japanese Patent Application Laid-Open Specification No. 2001-266954

An aspect of the present invention is to provide a trade-in battery system wherein used secondary batteries are purchased and then proposed for selling after being charged, and this system is advantageous in that: (i) the system is easily practiced from the viewpoint of price and market; (ii) the system has convenience similar to that in primary batteries; (iii) it is easy to distinguish the used secondary batteries from the charged secondary batteries; and (iv) the quality inspection and control of the secondary batteries in stores dealing in the secondary batteries are excellent.

According to the present invention, the following effects can be obtained.

(1) The amount of batteries disposed of is dramatically reduced, and therefore it is possible to lower the cost of disposal of waste batteries and the load on the environment, and further resources can be effectively utilized.

(2) A charged secondary battery priced at the price of a primary battery can be sold.

(3) No charging operation is required, and therefore secondary batteries can be used as if they are primary batteries.

(4) The store at which a secondary battery is purchased may be different from the store which buys the used secondary battery as long as the stores are stores dealing in secondary batteries in the trade-in battery system, and hence the convenience is remarkable.

(5) A customer buys a new or charged secondary battery in its hometown, and the customer uses the secondary battery in the destination of the travel and then the customer can sell discharged secondary batteries to a store dealing in secondary batteries in the trade-in battery system.

(6) The selling step is independent of the purchasing step, and customers and stores suffer no restrictions, e.g., restriction that a store which sells a charged secondary battery must take in or purchase the used secondary battery. In other words, customers can escape anytime from the loop of the trade-in battery system without a problem of a loss of money or infringing penal regulations, and thus the selectivity is excellent.

(7) A secondary battery for trade-in battery system is inspected whenever the secondary battery is handled by a store dealing in secondary batteries, and hence the reliability of the secondary batteries is high and the secondary batteries can satisfy customers.

(8) The employment of an exclusive packaging makes it easy to distinguish such used secondary batteries from charged secondary batteries.

SUMMARY OF THE INVENTION

The present inventors have conducted extensive and intensive studies with a view toward achieving the above aspect, and, as a result, they have found that a conventionally known trade-in battery system, wherein used secondary batteries are purchased and then proposed for selling after being charged, does not efficiently cooperate with the quality inspection for secondary batteries in stores dealing in secondary batteries and the service flow before and after the quality inspection, and hence it is difficult to distinguish used secondary batteries from charged secondary batteries and to control these batteries, thus making it difficult to practice the system. The present inventors have made further studies and also found that it is currently difficult to improve the conventional trade-in battery system so that the system is easily practiced from the viewpoint of price and market and has convenience similar to that in primary batteries.

In order to solve the above problems, the present inventors have conducted extensive and intensive studies with a view toward improving the trade-in battery system in efficiency and quality by adding to the trade-in battery system a storage step and an inspection step, facilitating the control of the trade-in battery system by adding a packaging step, and improving the system itself by these improvements. As a result, they have created a trade-in battery system wherein used secondary batteries are purchased and then proposed for selling after being charged, and wherein the trade-in battery system comprises a buying or purchasing step, a pre-storage deterioration inspection step, a charging step, a storage step, a packaging step, and a selling step, and found that the trade-in battery system solves all the above problems.

In addition, the present inventors have found that, when employing a method for packaging a secondary battery, comprising simultaneously covering a positive electrode terminal and a negative electrode terminal of the charged secondary battery with a heat-shrinkable polymer film in a sash-like form, packaging is achieved by heat shrinkage and hence the packaging treatment is facilitated, and the packaging material used in the packaging can be provided with various information, and the packaging material in a sash-like form can be easily removed, and, by using a biodegradable polymer as the heat-shrinkable polymer, not only can the amount of waste be reduced, but also environmental problems can be dealt with.

Further, the present inventors have succeeded in creating a trade-in battery system apparatus which comprises, after a used secondary battery is put in an inlet, automatically conducting a purchasing step, a pre-storage deterioration inspection step, a charging step, a storage step, a packaging step, and a selling step, and providing a packaged, charged secondary battery in an outlet, and found that the apparatus can automate the trade-in battery system and can realize further improvement of the trade-in system in efficiency.

The present inventors have obtained the above various findings, and then further conducted extensive and intensive studies, and the present invention has been completed.

Specifically, the present invention is directed to:

(1) a trade-in battery system, wherein used secondary batteries are purchased and then proposed for selling after being charged, which comprises a purchasing step, a pre-storage deterioration inspection step, a charging step, a storage step, a packaging step, and a selling step;

(2) the trade-in battery system according to item (1) above, further comprises at least one of a battery visual inspection step and a storage deterioration inspection step; and (3) the trade-in battery system according to item (2) above, wherein the purchasing step, the pre-storage deterioration inspection step, the charging step, the storage step, the battery visual inspection step, the packaging step, and the selling step are carried out in this order, or the purchasing step, the pre-storage deterioration inspection step, the storage step, the storage deterioration inspection step, the charging step, the packaging step, and the selling step are carried out in this order.

In addition, the present invention is directed to:

(4) the trade-in battery system according to item (1) above, wherein the pre-storage deterioration inspection step comprises charging-discharging frequency checking step;

(5) the trade-in battery system according to item (1) above, further comprises a memory effect checking step after the pre-storage deterioration inspection step, wherein the battery suffering from the memory effect is subjected to refresh discharge;

(6) the trade-in battery system according to item (1) above, wherein the battery rejected in the pre-storage deterioration inspection step is provided with a marking which identifies a battery failure; and (7) the trade-in battery system according to item (1) above, wherein the storage step comprises a step for storing the charged secondary battery in a temperature-controlled environment.

Further, the present invention is directed to:

(8) the trade-in battery system according to item (1) above, wherein the packaging step comprises a film packaging step which covers the charged secondary battery so as to be in close contact with the outer surface of the battery, and optionally a product packaging step which covers the charged secondary battery so as not to be in close contact with the outer surface of the battery;

(9) the trade-in battery system according to item (8) above, wherein the film packaging step simultaneously covers a positive electrode terminal and a negative electrode terminal of the secondary battery with a heat-shrinkable polymer film in a sash-like form;

(10) the trade-in battery system according to item (9) above, wherein the heat-shrinkable polymer film is a film having perforation in the widthwise direction; and

(11) the trade-in battery system according to item (9) above, wherein the heat-shrinkable polymer film is provided with an identifying code which indicates at least the battery individual and the condition of the charged battery.

Further, the present invention is directed to:

(12) the trade-in battery system according to item (8) above, wherein at least one of the film packaging and the product packaging is provided with at least one of an indication which identifies a secondary battery for trade-in battery, a charging date indication, a storage end date indication, and an indication which identifies a store dealing in secondary batteries for trade-in battery;

(13) a method for film-packaging a secondary battery, comprising simultaneously covering a positive electrode terminal and a negative electrode terminal of a charged secondary battery with a heat-shrinkable polymer film in a sash-like form; and

(14) the method for film-packaging a secondary battery according to item (13) above, wherein the heat-shrinkable polymer film is a film in a sash-like form having perforation in the widthwise direction.

Furthermore, the present invention is directed to:

(15) a trade-in battery system apparatus comprising, after a used secondary battery is put in an inlet, automatically conducting a purchasing step, a pre-storage deterioration inspection step, a charging step, a storage step, a packaging step, and a selling step, and providing a packaged, charged secondary battery in an outlet; and

(16) the trade-in battery system apparatus according to item (15) above, further comprising automatically conducting at least one of a battery visual inspection step and a storage deterioration inspection step.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which:

FIG. 7 is a schematic block diagram of a trade-in battery system apparatus of the present invention, showing a preferred example of the apparatus in which a used secondary battery is charged before being stored; and FIG. 8 is a graph showing storage properties of an AA-size nickel-metal hydride battery.

DESCRIPTION OF THE PREFERRED EMBODIMENTS

Figure 1:
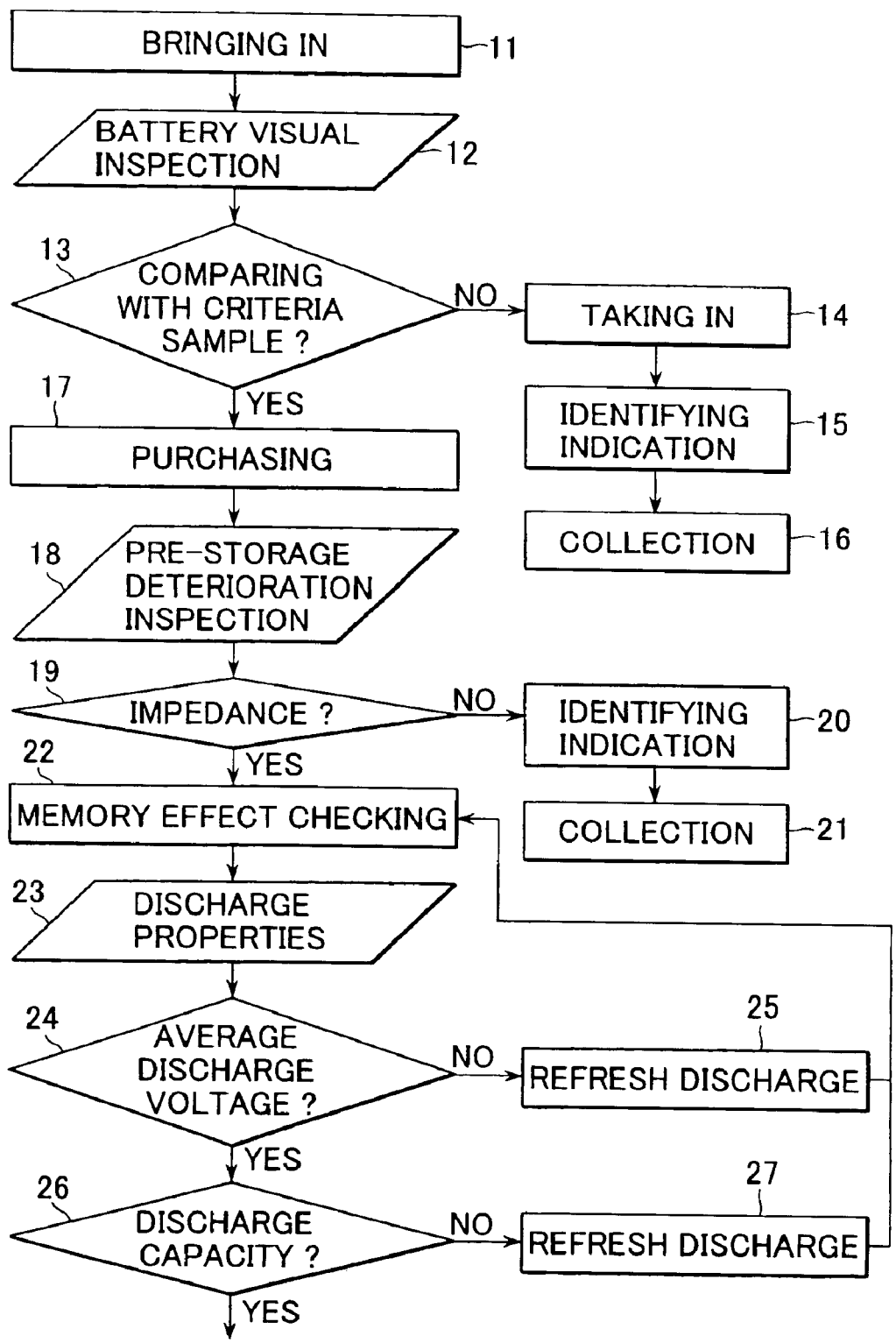
FIG. 1 shows the first half of steps in a service flow example of a preferred trade-in battery system of the present invention.

The present invention is a trade-in battery system where used secondary batteries are purchased and then sold after being charged, wherein the trade-in battery system comprises a purchasing step, a pre-storage deterioration inspection step, a charging step, a storage step, a packaging step, and a selling step.

The secondary battery used in the present invention is any battery rechargeable after being used. With respect to the constituent elements of the secondary battery, for example, positive electrode current collector, positive electrode active material, negative electrode current collector, negative electrode active material, and electrolyte, there is no particular limitation, and they may be ones conventionally known. For example, the secondary battery may comprise an acid, alkaline, or non-aqueous electrolyte, or the secondary battery may comprise a gaseous, liquid, or solid positive electrode active material. Examples include zinc-air battery, aluminum-air battery, zinc-chlorine battery, nickel-metal hydride battery, redox flow battery, zinc-bromine battery, lead storage battery, nickel-cadmium battery, iron-nickel battery, zinc-nickel battery, zinc-silver oxide battery, manganese dioxide-lithium battery, vanadium oxide-lithium battery, lithium ion battery, molybdenum disulfide-lithium battery, nickel oxide-lithium battery, sodium-sulfur battery, sodium-metal chloride battery, lithium-iron sulfide battery, and polymer battery. In the present invention, preferred are lead storage battery, nickel-metal hydride battery, nickel-cadmium battery, and lithium battery. Many of the secondary batteries are on the market as commercial products, and, in the present invention, these commercial products can be appropriately used.

In the present invention, with respect to the purchasing step, there is no particular limitation as long as a used secondary battery can be obtained. The "used secondary battery" may be any discharged secondary battery, which is selected from the above-mentioned secondary batteries. With respect to the condition of the discharged secondary battery, there is no particular limitation, and the secondary battery may be in the condition of, for example, completely discharged or half-discharged. Examples include discharged secondary batteries for use in electric appliances. With respect to the way of obtaining used secondary batteries, there is no particular limitation in the present invention, and examples include a way of obtaining used secondary batteries with payments and a way of obtaining them free of payment. When using the way of obtaining used secondary batteries with payments, either customers pay money and stores dealing in used secondary batteries obtain them, or stores pay for used secondary batteries and obtain them. For example, a store employing the trade-in battery system pays for a secondary battery used by a customer and takes in it, a store employing the trade-in battery system takes in a secondary battery used by a customer free of payment, or a customer pays money and a store employing the trade-in battery system takes in a secondary battery used by the customer.

In the present invention, it is preferred that the battery visual inspection step is carried out before the purchasing step. With respect to the "battery visual inspection step", there is no particular limitation as long as a battery can be visually inspected. For example, using a criteria sample, a used secondary battery is visually compared with the sample and judged. When the used secondary battery is rejected in the battery visual inspection step, for example, the battery is judged to be poorer than the criteria sample, it is preferred that the used secondary battery is taken in, and it is preferred that the used secondary battery taken in is collected by workers, such as recycle workers or waste treatment workers. In the present invention, it is preferred that, before being collected, the secondary battery is provided with an identifying indication made by a method of marking, for example, writing using a pen or the like, coating, or application of a seal. When the used secondary battery is judged to be more excellent than the criteria sample in the visual inspection, it is preferred that the purchasing step is carried out.

The pre-storage deterioration inspection step is not limited as long as the degree of deterioration of the used secondary battery obtained in the purchasing step can be inspected. A known method may be appropriately employed, and, as an example of the known method, there can be mentioned comparison checking in which an impedance of the secondary battery is measured, and the measurement value is compared with a predetermined value as a criterion. In the present invention, with respect to the criterion for the reusable battery, there is no particular limitation, and it may be set according to the type of the secondary battery. In the present invention, when the secondary battery is an AA-size nickel-metal hydride battery, the value as a criterion used in the comparison checking is preferably an impedance of about 20 to 1 kΩ, more preferably an impedance of about 50 to 300 mΩ, most preferably an impedance of about 80 to 200 mΩ (e.g., 100 mΩ). The above preferred value as a criterion is a value when an AA-size nickel-metal hydride battery is used as the secondary battery, and, when the initial value of impedance of the battery is about 20 to 30 mΩ, the criterion value is the impedance when the capacity maintaining ratio is lowered to 60% by, e.g., a test of repeating the charging-discharging operation cycle. Thus, the inspection of the degree of deterioration of the secondary battery makes it possible to omit to indicate on the secondary battery or to individually control using a server the charging-discharging frequency history per secondary battery. When the secondary battery is rejected in the pre-storage deterioration inspection step, it is preferred that the rejected secondary battery is collected by, for example, recycle workers or waste treatment workers, and it is preferred that, before being collected, the secondary battery is provided with a marking which identifies a battery failure.

In the present invention, when the secondary battery is a secondary battery which possibly suffers from memory effect, for example, a nickel-cadmium battery or a nickel-metal hydride battery, it is preferred that, after the pre-storage deterioration inspection step, a memory effect checking step is carried out. The memory effect is a phenomenon such that, for example, repetition of a cycle of incomplete charging and incomplete discharging of the secondary battery lowers the electric capacity at which the secondary battery can be actually used. As an example of a method for checking the memory effect, there can be mentioned a method in which the secondary battery is discharged and, for example, an average discharge voltage or/and a discharge capacity are measured to check the memory effect. In the present invention, preferred is a method in which an average discharge voltage is measured and the memory effect is checked by knowing as to whether the measured value has reached a value as a criterion, and then a discharge capacity is measured and the memory effect is checked again by knowing as to whether the measured value has reached a value as a criterion.

It is preferred that the secondary battery judged to suffer from the memory effect in the memory effect checking step is subjected to refresh discharge. The refresh discharge is achieved by a method in which the secondary battery temporarily lowered in capacity due to the memory effect is discharged under a small load, preferably completely, so that the secondary battery can recover the substantial capacity. In the present invention, the refresh discharge is not necessarily complete discharge. The refresh discharge has conventionally been closely studied, and the refresh discharge may be carried out according to the method studied.

The charging step is not limited as long as the secondary battery can be charged. The "charging" generally means permitting an electric current to flow in the opposite direction to the direction of the discharge of the battery from an external power source (e.g., household power source or power source for business), but, in the present invention, there is no particular limitation. With respect to the method for charging, there is no particular limitation, and it may be a known method using, for example, a commercially available charger. The charging may be a quick charge.

In the present invention, it is preferred to check the condition of the charged secondary battery in the charging step. With respect to the method for checking the condition of the charged battery, there is no particular limitation, and it may be a known method. Examples include an open circuit voltage (hereinafter, frequently referred to simply as "OCV") measurement method. The "OCV measurement method" may be a known method in which the open circuit voltage of the secondary battery is measured using, for example, a voltage measurement apparatus, such as a commercially available tester. The condition of the charged secondary battery can be checked by comparing the open circuit voltage measured by the OCV measurement method with a value as a criterion to know as to whether the voltage measured has reached the criterion value. The criterion value may be appropriately set depending on the type of the secondary battery or the like.

With respect to the storage step, there is no particular limitation as long as the used secondary battery or the charged secondary battery can be stored. A known method may be appropriately employed, and examples include a method in which the secondary battery is stored in a temperature-controlled environment. In the present invention, the temperature set for the temperature-controlled environment is preferably about 60° C. or lower, more preferably about 40° C. or lower, most preferably about −10 to 25° C. The change in temperature is preferably about −15 to 15° C., more preferably about −10 to 10° C., most preferably about −5 to 5° C., in terms of an average environment temperature. The conditions for storage are appropriately selected, but, in the present invention, it is preferred that the conditions are selected using the relationship between the capacity maintaining ratio and the storage term as a yardstick. Further, in the present invention, when the secondary battery is an AA-size nickel-metal hydride battery, it is preferred that the storage temperature or storage term is selected with reference to, for example, the storage properties of the battery shown in FIG. 8. FIG. 8 is a graph showing the storage properties of an AA-size nickel-metal hydride battery per storage temperature wherein a capacity maintaining ratio is taken as the ordinate and a storage term is taken as the abscissa, indicating changes with time in the capacity maintaining ratio of the AA-size nickel-metal hydride battery stored at different storage temperatures. With respect to the "capacity maintaining ratio", there is no particular limitation, and it is obtained by calculation as a ratio of the discharge capacity after storage to the discharge capacity before storage, which is determined by, for example, a method in which an AA-size nickel-metal hydride secondary battery is subjected to constant current charging at a current of 0.16 A in an environment at 25° C. for 16 hours, and the charged secondary battery is stored at a predetermined temperature for a predetermined period of time, and, before and after the storage, the secondary battery is subjected to constant current discharging at a current of 1.6 A in an environment at 25° C. to determine the discharge capacity before and after the storage.

The packaging step is not limited as long as the charged secondary battery can be packaged. With respect to the "packaging", there is no particular limitation as long as at least part of the charged secondary battery is covered with a packaging material, and the packaging material is not particularly limited, and it may be a film or a casing. In the present invention, it is preferred that the packaging is film packaging or product packaging. Preferred packaging in the present invention is described below.

Figure 3:
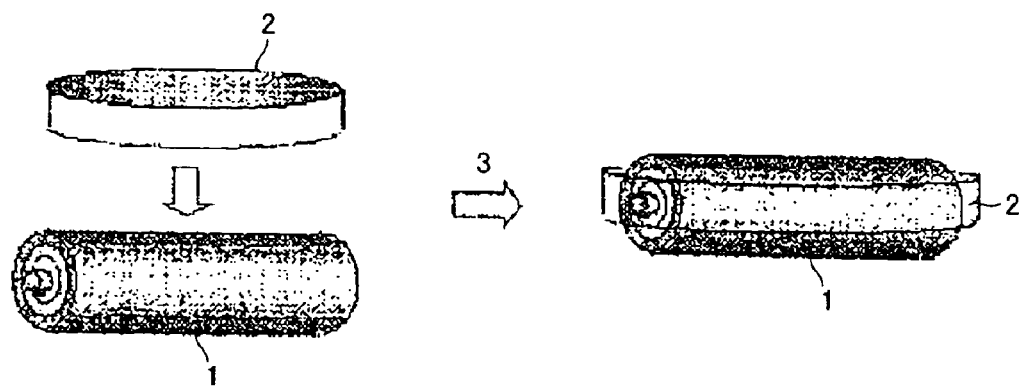
FIG. 3 is a diagrammatic view of a charged secondary battery and a heat-shrinkable polymer film in a tube form, showing a resin film covering treatment in a packaging method of the present invention used in the packaging step.
Figure 4:
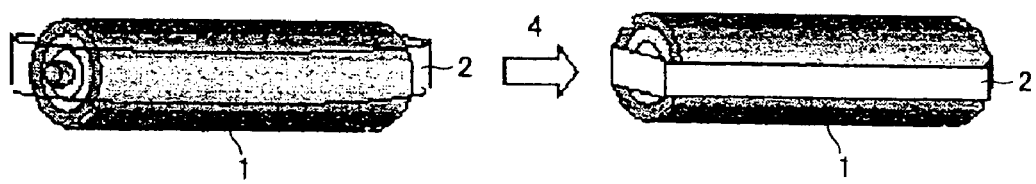
FIG. 4 is a diagrammatic view of a charged secondary battery and a heat-shrinkable polymer film in a tube form, showing a packaging step utilizing film shrinkage caused by a treatment of heating the film in a packaging method of the present invention used in the packaging step.
Figure 5:
FIG. 5 shows a charged secondary battery, which is packaged in the packaging step in the present invention, and which has a package film having perforation.

In the present invention, it is preferred that the packaging employed in the packaging step is film packaging. The film packaging may be any packaging as long as the charged secondary battery is packaged in a film. In the present invention, it is preferred that the film packaging is packaging which covers the charged secondary battery so as to be in close contact with the outer surface of the battery. As an example of a preferred embodiment of the packaging, there can be mentioned packaging which simultaneously covers a positive electrode terminal and a negative electrode terminal of the charged secondary battery with a polymer film in a sash-like form. In the present invention, it is preferred that the polymer resin constituting the polymer film used in the film packaging is a heat-shrinkable resin, and it is preferred that the polymer resin has a glass transition temperature of 110° C. or lower. From the viewpoint of protecting the social environment, it is preferred that the polymer resin is a biodegradable resin. In the present invention, preferred packaging methods include a method for packaging the charged secondary battery in which, for example, as shown in FIG. 3, using a heat-shrinkable polymer 2 in a tube form, a positive electrode terminal and a negative electrode terminal of the charged secondary battery 1 are covered simultaneously in a sash-like form as indicated by an arrow 3, and then treated to shrink heat-shrinkable polymer 2 by heating as shown by an arrow 4 in FIG. 4. The packaging for the charged secondary battery 1 packaged by the above packaging method can prevent terminals from suffering corrosion due to moisture condensation caused when the battery is taken out after the storage step, and further prevent an occurrence of external short-circuiting due to contact with a good conductor. In the present invention, it is preferred that the polymer film 2 in a sash-like form has perforation 5 in the widthwise direction.

Specific examples of the resins include poly(α-hydroxy acid), such as polyglycolic acid and polylactic acid, and copolymers comprised of repeating units constituting these; poly(ω-hydroxyalkanoate), such as poly(ε-caprolactone) and poly(β-propiolactone); and poly(β-hydroxyalkanoate), such as poly-3-hydroxypropionate, poly-3-hydroxybutyrate, poly-3-hydroxycaproate, poly-3-hydroxyheptanoate, poly-3-hydroxyoctanoate, and copolymers comprised of repeating units constituting these and repeating units constituting poly-3-hydroxyvalerate or poly-4-hydroxybutyrate.

Further, examples of the resins include those comprised of a polycondensation polymer of glycol and a dicarboxylic acid, e.g., polyethylene oxalate, polyethylene succinate, polyethylene adipate, polyethylene azelate, polybutylene oxalate, polybutylene succinate, polybutylene adipate, polybutylene sebacate, polyhexamethylene sebacate, polyneopentyl oxalate, and copolymers comprised of repeating units constituting these. The polymer film used in the present invention is not limited to the biodegradable resin, and it may be, for example, a synthetic resin, such as polypropylene, polyethylene, polyester, polyvinyl chloride, or polystyrene.

Many of these resins are commercially available, and, in the present invention, as the resin, a commercial product can be appropriately used. Examples include a polylactic acid resin commercial product (trade name: Lacea), manufactured and sold by Mitsui Chemicals, Inc., and SFBS similar to this product.

The polymer film may be any film as long as it is a film containing the above resin as at least part of the film. It may be a film formed by a known forming method using the above resin, or may be a film as a commercial product containing the above resin.

In the present invention, preferred examples of packaging used in the packaging step include product packaging. The product packaging generally means packaging for the charged secondary battery as a product, but, in the present invention, there is no particular limitation. For example, there can be mentioned accommodation of the charged secondary battery in a casing and wrapping of the charged secondary battery in packaging paper. In the present invention, it is preferred that the product packaging is packaging which covers the charged secondary battery so as not to be in close contact with the outer surface of the battery. In addition, the charged secondary battery may be packaged twice or more in the packaging step, and, in the present invention, it is preferred that the charged secondary battery is subjected to film packaging, and then optionally subjected to product packaging.

In the present invention, it is preferred that, before the packaging step, the charged secondary battery is visually inspected. For example, using a criteria sample, the charged secondary battery is visually compared with the sample. When the used secondary battery is judged to be poorer than the criteria sample in the visual inspection of the charged secondary battery, it is preferred that the charged secondary battery is collected by, for example, recycle workers or waste treatment workers. In the present invention, it is preferred that, before being collected, the secondary battery is provided with an identifying indication made by a method of marking or the like. The "marking" is made on the charged secondary battery in the same manner as that mentioned above. The marking makes it possible to distinguish the secondary batteries accepted in the visual inspection from the rejected secondary batteries. When the used secondary battery is judged to be more excellent than the criteria sample in the visual inspection, it is preferred that the packaging step is carried out.

In the present invention, it is preferred that, after the packaging step, the packaging is provided with an identifying code, such as an indication which identifies a secondary battery for trade-in battery, a charging date indication, a storage end date indication, or/and an indication which identifies a store dealing in secondary batteries for trade-in battery. For example, when film packaging is carried out in the packaging step, a heat-shrinkable polymer film is provided with an identifying code which indicates the battery individual and the condition of the charged battery, or a heat-shrinkable polymer film is printed with a date, for example, a charging date, a storage starting date, or a storage end date (hereinafter, referred to also as "date printing"). Especially in a temperature-controlled environment, the fully charged secondary battery possibly changes with time in residual capacity due to self-discharge. Further, for example, by virtue of date printing, a charging date, a storage environment temperature or the like can be known, thus making it possible to know as to whether the charged secondary battery secures a capacity such that the battery can be sold as such to customers. When a selling date is printed, customers can appropriately use the individual secondary batteries, taking into consideration, for example, service life, or stores dealing in the secondary batteries can easily know progression of self-discharge of the charged secondary battery which is allowed to stand for a long term without being used. In the present invention, it is preferred that, after the packaging step or after providing the identifying code, using the packaged, charged secondary battery or the packaged, charged secondary battery provided with the identifying code, the selling step is carried out as follows.

In the present invention, with respect to the selling step, there is no particular limitation as long as the charged secondary battery can be sold. A known method may be appropriately employed, and examples include a method of selling the charged secondary batteries in convenience stores, and a method of selling the charged secondary batteries by vending machines. As an example of a manner of selling, there can be mentioned a manner of selling the charged secondary batteries as products. In the present invention, it is preferred that the charged secondary batteries to be sold have selling prices as low as those of primary batteries.

In the present invention, it is preferred that, before the selling step, the charged secondary battery is subjected to packaging visual inspection. For example, using a criteria sample, the packaging of the charged secondary battery is visually compared with the sample and judged. When the charged secondary battery is judged to be poorer than the criteria sample in the packaging visual inspection for the charged secondary battery, it is preferred that the packaging step is carried out again for the charged secondary battery and then, if desired, the secondary battery is provided with the identifying code, and then the packaging visual inspection is carried out again. When the charged secondary battery is judged to be more excellent than the criteria sample in the packaging visual inspection, it is preferred that the selling step is carried out.

In the present invention, it is preferred that the trade-in battery system further comprises a battery performance inspection step or/and a storage deterioration inspection step. The battery performance inspection step and the storage deterioration inspection step are individually described below.

In the present invention, with respect to the battery performance inspection step, there is no particular limitation as long as the performance of the charged secondary battery can be inspected. With respect to the "battery performance inspection", there is no particular limitation, and it maybe inspection using a known method. It is preferred that the inspection is capacity checking for the charged secondary battery, and it is more preferred that the capacity checking is inspection using an estimation method from the storage term (days) and correlation graph.

The storage deterioration inspection step is not limited as long as the degree of deterioration of the used secondary battery after being stored can be inspected. For example, an impedance of the secondary battery is measured to estimate the charging-discharging operation cycle, determining the degree of deterioration of the secondary battery. As an example of a method for determining the degree of deterioration of the secondary battery from the estimated charging-discharging operation cycle, there can be mentioned a method in which, utilizing the tendency that the internal impedance of the battery rises as the charging-discharging frequency increases, the charging-discharging frequency is estimated to judge whether the battery is reusable. Thus, only the inspection of the degree of deterioration of the secondary battery makes it possible to omit to indicate on the secondary battery or to individually control using a server the charging-discharging frequency history per secondary battery.

In the present invention, the above-described steps can be individually used appropriately. Therefore, with respect to the order of the steps, there is no particular limitation, but, in the present invention, it is preferred that the trade-in battery system is the trade-in battery system wherein the purchasing step, the pre-storage deterioration inspection step, the charging step, the storage step, the battery performance inspection step, the packaging step, and the selling step are carried out in this order, or the purchasing step, the pre-storage deterioration inspection step, the storage step, the storage deterioration inspection step, the charging step, the packaging step, and the selling step are carried out in this order. Hereinbelow, the trade-in battery system of the present invention will be described with reference to the drawings.

Figure 2:
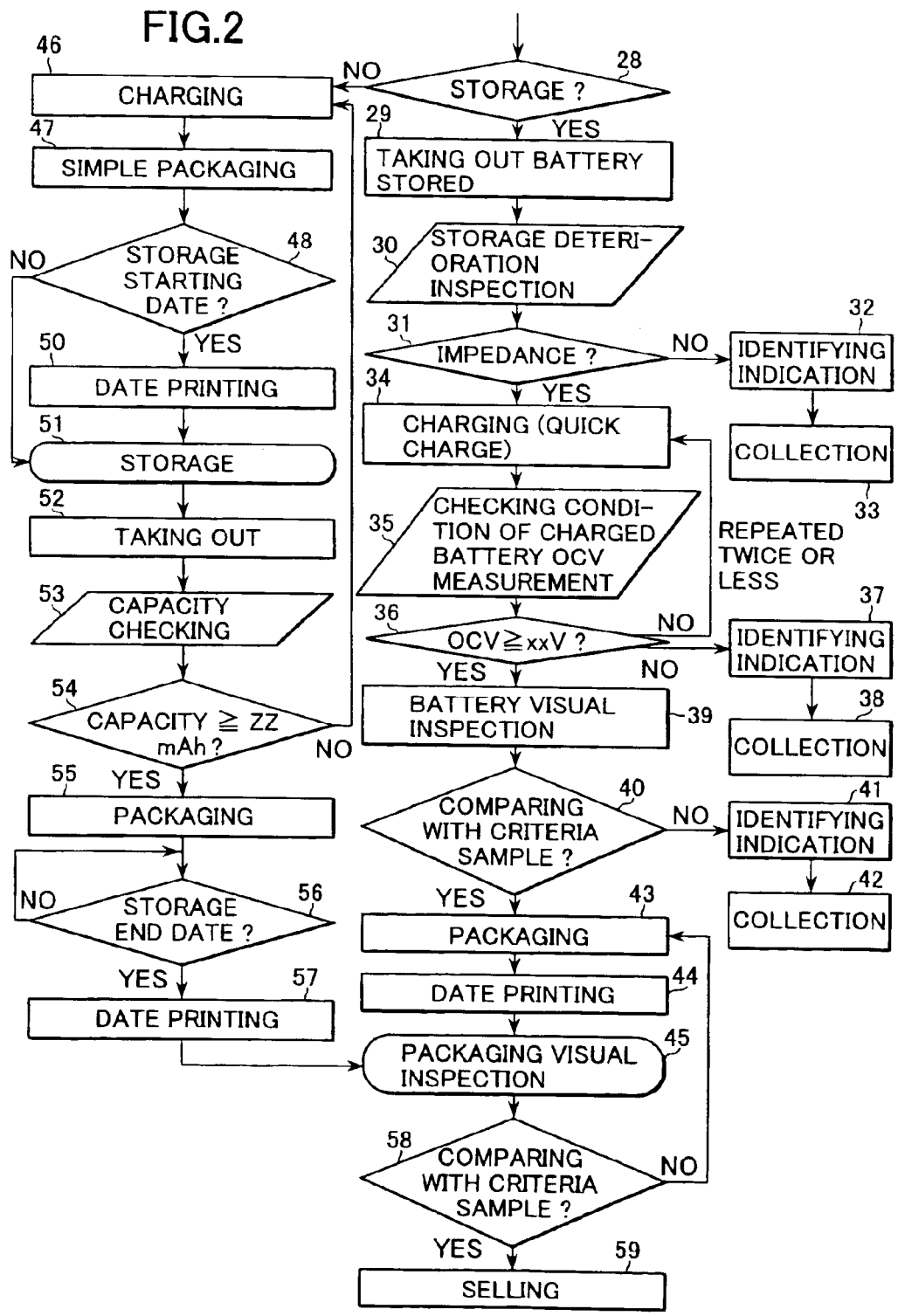
FIG. 2 shows the latter steps in the service flow example of the preferred trade-in battery system of the present invention.

FIG. 1 and FIG. 2 show an example of the service flow of a preferred trade-in battery system of the present invention. As shown in FIG. 1, a used secondary battery is brought in at step 11, and then subjected to battery visual inspection at step 12. For example, a customer brings in at step 11 by itself a used secondary battery, and a worker in a store employing the trade-in battery system receives the battery and performs comparing with criteria sample at step 13 in which the used secondary battery brought in by the customer is compared with a criteria sample. After the battery visual inspection at step 12, according to the result of the inspection, the used secondary battery is taken in at step 14 or bought at step 17. When the used secondary battery is taken in, the used secondary battery is provided with an identifying indication at step 15 by, for example, marking, and then the used secondary battery is collected at step 16. On the other hand, when the used secondary battery is bought at step 17, the used secondary battery is subjected to pre-storage deterioration inspection at step 18, and, when the judgement on the inspection is "rejected", the used secondary battery is provided with an identifying indication at step 20 by, for example, marking, and then the used secondary battery is collected at step 21. When the judgement on the inspection is "accepted", the used secondary battery is subjected to memory effect checking at step 22. In the memory effect checking at step 22, discharge properties of the used secondary battery are examined at step 23 to check whether an average discharge voltage has reached a value as a criterion at step 24 and whether a discharge capacity has reached a value as a criterion at step 26, thus knowing as to whether or not the used secondary battery suffers from memory effect. When the used secondary battery is judged to suffer from memory effect, it is subjected to refresh discharge at step 25, 27, and the memory effect checking at step 22 is carried out again.

In the present invention, when the used secondary battery is judged to suffer from no memory effect in the memory effect checking at step 22, it is preferred that the used secondary battery is stored 28 before being charged, or charged at step 46 before being stored. The case where the used secondary battery is stored before being charged and the case where the used secondary battery is charged before being stored are individually described below.

When the used secondary battery is stored before being charged, the charged secondary battery stored is taken out at step 29, and then subjected to storage deterioration inspection in which, for example, an impedance of the used secondary battery stored is measured at step 31. When the judgement on the inspection is "rejected", the used secondary battery is provided with an identifying indication at step 32 by, for example, marking, and then the used secondary battery is collected at step 33. When the judgement is "accepted", the used secondary battery is subjected to charging or quick charge at step 34, and then subjected to checking of the condition of the charged secondary battery by OCV measurement at step 35. When the OCV value obtained has not reached a value as a criterion at step 36, the charged secondary battery is provided with an identifying indication at step 37 by, for example, marking, and then the charged secondary battery is collected at step 38. When the OCV value obtained has reached a value as a criterion, the charged secondary battery is subjected to battery visual inspection at step 39, for example, comparing with a criteria sample at step 40, and, when the judgement on the inspection is "rejected", the used secondary battery is provided with an identifying indication at step 41 by, for example, marking, and then the used secondary battery is collected at step 42. When the judgement is "accepted", the charged secondary battery is subjected to packaging at step 43, and then subjected to date printing at step 44. After the date printing at step 44, packaging visual inspection at step 45 is carried out by, for example, comparing with a criteria sample, and, when the judgement on the inspection is "rejected", the packaging is carried out again at step 43. When the judgement is "accepted", the packaged, charged secondary battery is sold at step 59.

When the used secondary battery is charged before being stored, the charged secondary battery is subjected to simple packaging at step 47, and then, if desired, subjected to printing at step 50 of a date, for example, a storage starting date at step 48, and the charged secondary battery is stored at step 51. The charged secondary battery stored is taken out at step 52, and then the charged secondary battery stored is subjected to, for example, capacity checking at step 53. When the capacity value obtained has not reached a value as a criterion at step 54, the charging is carried out again at step 46. When the capacity value obtained has reached a value as a criterion, the charged secondary battery is subjected to packaging at step 55, and then, if desired, subjected to printing of a date at step 57, for example, a storage end date at step 56. However, the charged secondary battery is still stored, the step is returned at step 56. After the date printing at step 57, the charged secondary battery is subjected to packaging visual inspection at step 45, for example, comparing with a criteria sample at step 58, and, when the judgement on the inspection is "rejected", the packaging is carried out again at step 43. When the judgement is "accepted", the packaged, charged secondary battery is sold at step 59.

The packaged, charged secondary battery to be sold at step 59 may be different from the secondary battery which is brought in at step 11, and the service from the bringing in at step 11 to the storage at step 28, 51 and the service from the taking out at step 29, 52 of the battery stored to the selling can be independently carried out at step 59.

In the present invention, by using a trade-in battery system apparatus, the purchasing step, the pre-storage deterioration inspection step, the charging step, the storage step, the packaging step, and the selling step can be automatically carried out. The trade-in battery system apparatus maybe any apparatus as long as the purchasing step, the pre-storage deterioration inspection step, the charging step, the storage step, the packaging step, and the selling step can be automatically carried out. As an example, there can be mentioned an apparatus in which, after the used secondary battery is put in an inlet, the purchasing step, the pre-storage deterioration inspection step, the charging step, the storage step, the packaging step, and the selling step are automatically carried out to provide a packaged, charged secondary battery in an outlet.

In the present invention, it is preferred that the trade-in battery system used in the trade-in battery system apparatus further comprises the battery visual inspection step or/and the storage deterioration inspection step. As examples of trade-in battery system apparatuses, there can be mentioned a trade-in battery system apparatus which practices a trade-in battery system comprising the battery visual inspection step, the purchasing step, the pre-storage deterioration inspection step, the charging step, the storage step, the battery performance inspection step, the battery visual inspection step, the packaging step, and the selling step wherein the steps are carried out in this order, and a trade-in battery system apparatus which practices a trade-in battery system comprising the battery visual inspection step, the purchasing step, the pre-storage deterioration inspection step, the storage step, the charging step, the battery visual inspection step, the packaging step, and the selling step wherein the steps are carried out in this order. Hereinbelow, preferred embodiments of the trade-in battery system apparatus of the present invention will be described in more detail with reference to the following examples, which should not be construed as limiting the scope of the present invention.

Figure 6:
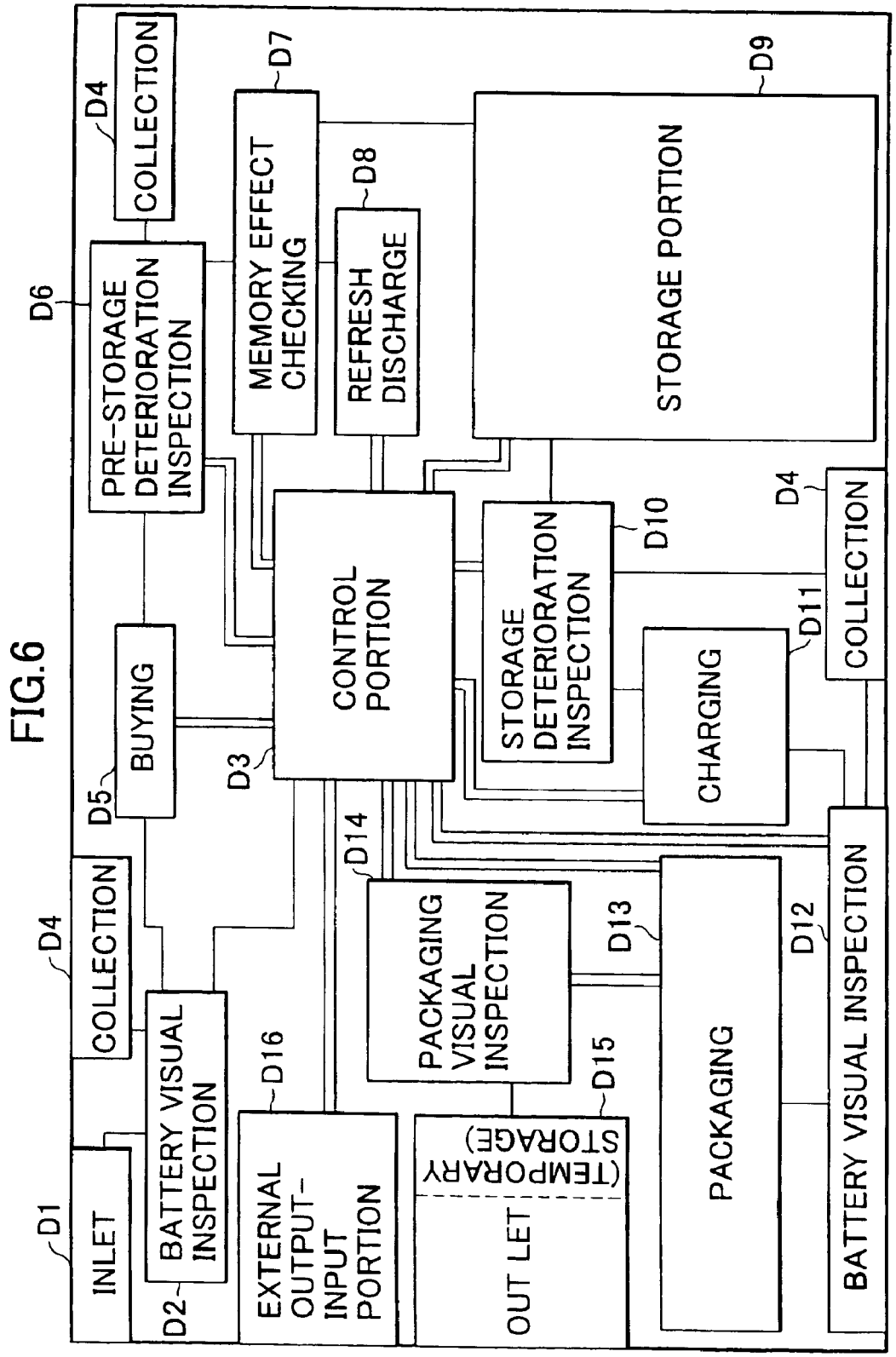
FIG. 6 is a schematic block diagram of a trade-in battery system apparatus of the present invention, showing a preferred example of the apparatus in which a used secondary battery is stored before being charged.

FIG. 6 is a schematic block diagram of a preferred trade-in battery system apparatus of the present invention, comprising the purchasing step, the pre-storage deterioration inspection step, the charging step, the storage step, the packaging step, the selling step, and the battery visual inspection step. The trade-in battery system apparatus comprising the purchasing step, the pre-storage deterioration inspection step, the charging step, the storage step, the packaging step, the selling step, and the battery visual inspection step is described below with reference to FIG. 6. A used secondary battery is put in an inlet D1, and visual inspection D2 for the used secondary battery is made by a control portion D3. Then, the control portion D3 makes a judgement on the inspection, and, when the judgement on the inspection is "rejected", the used secondary battery is collected D4 by the control portion D3. When the judgement on the inspection is "accepted", the used secondary battery is bought D5, and, for example, the control portion D3 outputs indication information "purchasing completed" on an external output-input portion D16. Then, pre-storage deterioration inspection D6 for the used secondary battery is made by the control portion D3, and the control portion D3 makes a judgement on the inspection. When the judgement of the control portion D3 on the pre-storage deterioration inspection D6 is "rejected", the used secondary battery is collected D4 by the control portion D3. When the judgement of the control portion D3 on the inspection is "accepted", memory effect checking D7 for the used secondary battery is made by the control portion D3. After the memory effect checking D7, when the control portion D3 judges the used secondary battery to suffer from the memory effect, the used secondary battery is subjected to refresh discharge D8, and, after the refresh discharge D8, the memory effect checking D7 is carried out again. When the control portion D3 judges the used secondary battery to suffer from no memory effect, the used secondary battery is charged D1 by the control portion D3, and the used charged secondary battery is stored in a storage portion D9.

The charged secondary battery is taken out the storage portion D9 by the control portion D3, and battery performance inspection D17 for the charged secondary battery is made by the control portion D3, and the control portion D3 makes a judgement on the inspection. When the judgement of the control portion D3 on the inspection is "rejected", the charged secondary battery is charged D11 again. When the judgement of the control portion D3 on the inspection is "accepted", battery visual inspection D12 for the charged secondary battery is made by the control portion D3, and the control portion D3 makes a judgement on the inspection. When the judgement on the inspection is "rejected", the charged secondary battery is collected D4 by the control portion D3, and, when the judgement on the inspection is "accepted", packaging D13 of the charged secondary battery is made by the control portion D3. After the packaging, packaging visual inspection D14 is made by the control portion D3, and the control portion D3 makes a judgement on the inspection. When the judgement of the control portion D3 on the inspection is "rejected", the packaging D13 is carried out again, and, when the judgement of the control portion D3 on the inspection is "accepted", the control portion D3 temporarily stores the packaged, charged secondary battery and provides it in an outlet D15, so that the charged secondary battery can be sold.

FIG. 7 is a schematic block diagram of another preferred trade-in battery system apparatus of the present invention, comprising the purchasing step, the pre-storage deterioration inspection step, the charging step, the storage step, the packaging step, the selling step, the battery visual inspection step, and the storage deterioration inspection step. A used secondary battery is put in an inlet D1, and then, for example, information "put in" is output to a control portion D3 from the inlet D1, and battery visual inspection D2 for the used secondary battery is made by the control portion D3, and then the control portion D3 makes a judgement on the inspection. When the judgement on the inspection is "rejected", the used secondary battery is collected D4 by the control portion D3. When the judgement on the inspection is "accepted", the used secondary battery is bought D5, and the control portion D3 can output indication information "purchasing completed" on an external output-input portion D16. Then, pre-storage deterioration inspection D6 for the used secondary battery is made by the control portion D3, and the control portion D3 makes a judgement on the inspection. When the judgement of the control portion D3 on the pre-storage deterioration inspection D6 is "rejected", the used secondary battery is collected D4 by the control portion D3. When the judgement of the control portion D3 on the inspection is "accepted", memory effect checking D7 for the used secondary battery is made by the control portion D3. After the memory effect checking D7, when the control portion D3 judges the used secondary battery to suffer from the memory effect, the used secondary battery is subjected to refresh discharge D8. After the refresh discharge D8, the memory effect checking D7 is carried out again. When the control portion D3 judges the used secondary battery to suffer from no memory effect, the used secondary battery is stored in a storage portion D9.

The charged secondary battery is taken out the storage portion D9 by the control portion D3, and storage deterioration inspection D10 for the charged secondary battery is made by the control portion D3, and the control portion D3 makes a judgement on the inspection. When the judgement of the control portion D3 on the inspection is "rejected", the used secondary battery is collected D4 by the control portion D3. When the judgement of the control portion D3 on the inspection is "accepted", the used secondary battery is charged D11 by the control portion D3, and then battery visual inspection D12 for the used secondary battery is made by the control portion D3, and the control portion D3 makes a judgement on the inspection. When the judgement on the inspection is "rejected", the charged secondary battery is collected D4 by the control portion D3. When the judgement on the inspection is "accepted", packaging D13 of the charged secondary battery is made by the control portion D3. After the packaging, packaging visual inspection D14 is made by the control portion D3, and the control portion D3 makes a judgement on the inspection. When the judgement of the control portion D3 on the inspection is "rejected", the packaging D13 is carried out again, and, when the judgement of the control portion D3 on the inspection is "accepted", the control portion D3 temporarily stores the packaged, charged secondary battery and sells it at an outlet D15. In both FIGS. 6 and 7, the external output-input portion D16 manages functions of, e.g., payments of customers, and apparatus operating instruction.

What is claimed is:

1. A trade-in battery system wherein used secondary batteries are purchased and sold after being charged, comprising:

a purchasing step for purchasing used secondary batteries;

a pre-storage deterioration inspection step for inspecting said purchased used secondary batteries;

a charging step for charging said inspected used secondary batteries;

a storage step for storing said charged used secondary batteries;

a packaging step for packaging said stored used secondary batteries; and a selling step for selling said packaged used secondary batteries.

2. The trade-in battery system according to claim 1, further comprising:

at least one of a battery visual inspection step and a storage deterioration inspection step.

3. The trade-in battery system according to claim 2, wherein:

the purchasing step, the pre-storage deterioration inspection step, the charging step, the storage step, the battery visual inspection step, the packaging step, and the selling step are carried out in this order, or the purchasing step, the pre-storage deterioration inspection step, the storage step, the storage deterioration inspection step, the charging step, the packaging step, and the selling step are carried out in this order.

4. The trade-in battery system according to claim 1, wherein:

the pre-storage deterioration inspection step includes a step for charging-discharging frequency checking.

5. The trade-in battery system according to claim 1, further comprising:

a step for memory effect checking after the pre-storage deterioration inspection step, wherein the battery suffering from a memory effect is subjected to refresh discharge.

6. The trade-in battery system according to claim 1, wherein:

the battery rejected in the pre-storage deterioration inspection step is provided with a marking which identifies a battery failure.

7. The trade-in battery system according to claim 1, wherein:

the storage step is carried out by storing the charged secondary battery in a temperature-controlled environment.

8. The trade-in battery system according to claim 1, wherein:

the packaging step includes a film packaging step which covers the secondary batteries being charged so as to be in close contact with the outer surface of the secondary batteries, and optionally a product packaging step which covers the charged secondary batteries so as not to be in close contact with the outer surface of the secondary batteries.

9. The trade-in battery system according to claim 8, wherein:

the film packaging step simultaneously covers a positive electrode terminal and a negative electrode terminal of each of the secondary batteries with a heat-shrinkable polymer film in a sash-like form.

10. The trade-in battery system according to claim 9, wherein:

the heat-shrinkable polymer film is a film having perforation in the widthwise direction.

11. The trade-in battery system according to claim 9, wherein:

the heat-shrinkable polymer film is provided with an identifying code which indicates at least the battery individual and the condition of the charged secondary batteries.

12. The trade-in battery system according to claim 8, wherein:

one of an indication which identifies a secondary battery for trade-in battery, a charging date indication, a storage end date indication, and an indication which identifies a store dealing in secondary batteries for trade-in battery is provided to one of the film packaging and the product packaging.

13. A trade-in battery system apparatus, wherein:

a purchasing step for purchasing used secondary batteries; a pre-storage deterioration inspection step for inspecting said purchased used secondary batteries; a charging step for charging said inspected used secondary batteries;

a storage step for storing said charged used secondary batteries; a packaging step for packaging said stored used secondary batteries; a selling step for selling said packaged used secondary batteries to provide a packaged and charged secondary batteries in an outlet are automatically conducted after used secondary batteries are put in an inlet.

14. The trade-in battery system apparatus according to claim 13, wherein:

at least one of a step for battery visual inspection and a step of storage deterioration inspection step is further automatically conducted.

* * * * *